(12) United States Patent
Sakai

(10) Patent No.: US 7,236,454 B2
(45) Date of Patent: Jun. 26, 2007

(54) LOOP DIAGNOSIS SYSTEM AND METHOD FOR DISK ARRAY APPARATUSES

(75) Inventor: Tomohiro Sakai, Tokyo (JP)

(73) Assignee: NEC Corporation, Tokyo (JP)

(*) Notice: Subject to any disclaimer, the term of this patent is extended or adjusted under 35 U.S.C. 154(b) by 1305 days.

(21) Appl. No.: 09/883,328

(22) Filed: Jun. 19, 2001

(65) Prior Publication Data

US 2002/0002440 A1    Jan. 3, 2002

(30) Foreign Application Priority Data

Jun. 21, 2000    (JP)    ............................. 2000-185588

(51) Int. Cl.
 *G01R 31/08* (2006.01)
 *G06F 11/00* (2006.01)
 *H04L 1/00* (2006.01)
 *H04L 12/26* (2006.01)

(52) U.S. Cl. ........................... 370/225; 370/242; 714/2

(58) Field of Classification Search ........ 370/216–217, 370/221–222, 242; 714/1–3, 5, 25
See application file for complete search history.

(56) References Cited

U.S. PATENT DOCUMENTS 6,578,158 B1 * 6/2003 Deitz et al. .................. 714/11
6,601,128 B1 * 7/2003 Burton et al. ............... 710/316

FOREIGN PATENT DOCUMENTS

| JP | A 5-127837 | 5/1993 |
|---|---|---|
| JP | A 5-128040 | 5/1993 |
| JP | A 6-282385 | 10/1994 |
| JP | A 8-263224 | 10/1996 |
| JP | 11-305944 | 11/1999 |
| JP | 11-306644 | 11/1999 |
| JP | 11-353126 | 12/1999 |
| JP | A 11-353126 | 12/1999 |
| JP | A 2000-99272 | 4/2000 |

* cited by examiner

*Primary Examiner*—Kevin C. Harper
(74) *Attorney, Agent, or Firm*—Young & Thompson

(57) ABSTRACT

Disks 21 through 2N have two loops 41A and 42B and, if any abnormality in a loop A41 is detected by an FC-AL state monitoring unit A13, a disk control unit A71 requests a disk control unit B72 to perform uncompleted disk processing. The disk control unit B72, complying with this request, executes that uncompleted disk processing, using a loop B42. Also, disk processing at a new instruction from a host is also executed by the disk control unit B72. After that, the disk control unit A71 diagnoses the loop A41.

16 Claims, 4 Drawing Sheets

LOOP DIAGNOSIS SYSTEM AND METHOD FOR DISK ARRAY APPARATUSES

BACKGROUND OF THE INVENTION

1. Field of the Invention

The present invention relates to a loop diagnosis system and method for disk array apparatuses, and more particularly to a loop diagnosis system and method for disk array apparatuses using an FC-AL (Fibre Channel-Arbitrated loop) interface disk.

2. Description of the Related Art

Along with the development of the information technology (IT) environment in recent years, the role of storage units in computer systems is taking on ever increasing importance, and the requirements for their performance, reliability and capacity also keep on increasing in stringency. In disk array apparatuses, these requirements are met by conforming the interface with the host to the FC-AL [Fibre Channel-Arbitrated Loop: a loop prescribed by ANSI (American National Standards Institute) X3.272-199x Rev 5.7 Aug. 22, 1997] or mounting the apparatus with an FC-AL interface disk.

If a loop abnormality, such as a link-down, occurs in an FC-AL (hereinafter to be referred to simply as a "loop") to disturb the loop state, processing on any other normal disk connected to the loop may be affected and become no longer able to function normally. In order to bring back the loop into a normal state, any faulty part should be removed from the loop, but if the loop abnormality is intermittent, complex loop diagnosing will be needed to pinpoint the faulty part, and in a modern disk array apparatus in which many disks are connected in a loop, it takes a long time to identify and remove the faulty disk.

One of such disk array apparatuses is disclosed in the Japanese Patent Application Laid-open No. 1999-353126 (Reference 1). According to the technique disclosed in Reference 1, the troubled loop is once cut off, and disks in the disk array apparatus are connected to the initiator host one by one to locate the fault. The faulty disk, as it is identified, is removed from the loop. This facilitates the faulty disk and serves to reduce the time taken to identify it.

Another such disk array apparatus is disclosed in the Japanese Patent Application Laid-open No. 1999-305944 (Reference 2) and the Japanese Patent Application Laid-open No. 1999-306644 (Reference 3). Reference 2 discloses an arrangement in which the link state is indicated by turning a lamp on when a link-down occurs and turning it off at the time of a link-up. Reference 3 discloses a technique by which the faulty disk is diagnosed after it is separated from the loop.

However, the technique disclosed in Reference 1 involves a problem that processing on normal disks is interrupted during the attempt to identify the faulty disk. There is a further disadvantage that, if the number of disks connected to the loop increases reflecting an expanded capacity of the disk array apparatus, the time taken to diagnose the loop will be further extended, and so will be the duration of the interruption of normal disk processing. Nothing to solve these problems is proposed in either Reference 2 or 3.

SUMMARY OF THE INVENTION

The present invention is intended to provide a loop diagnosis system and method for disk array apparatuses capable of avoiding the interruption of normal disk processing while processing to identify the faulty disk is being executed.

In order to solve the problems noted above, according to the invention, there is provided a loop diagnosis system for disk array apparatuses comprising:

a recording means having a plurality of loops for executing instructions from a host unit and consisting of a plurality of recording media;

a loop monitoring means for detecting any abnormality in any of the loops; and a loop control means for controlling the loops according to the result of monitoring by the loop monitoring means.

In the loop diagnosis system for disk array apparatuses according to the invention, the loop control means, if the loop monitoring means detects any abnormality in a specific loop, suspends the execution of any instruction in the specific loop.

In the loop diagnosis system for disk array apparatuses according to the invention, the loop control means, after suspending the execution of any instruction in the specific loop, substitutes another loop than the specific loop for further execution of the instruction done by the specific loop until then.

In the loop diagnosis system for disk array apparatuses according to the invention, the loop control means, after substituting the execution of the instruction previously done by the specific loop, diagnoses the specific loop.

In the loop diagnosis system for disk array apparatuses according to the invention, the loop control means, after diagnosing the specific loop, severs a specific one of the recording media from the specific loop.

In the loop diagnosis system for disk array apparatuses according to the invention, the loop control means, after severing the recording medium from the specific loop, releases the execution of any instruction by the specific loop from suspension.

The loop diagnosis system for disk array apparatuses according to the invention further includes a maintenance terminal for entering information equivalent to the result of monitoring by the loop monitoring means from elsewhere than the plurality of loops, wherein the loop control means controls the loops according to information entered into the maintenance terminal.

In the loop diagnosis system for disk array apparatuses according to the invention, the maintenance terminal displays information extracted from the loop control means.

A loop diagnosis method for disk array apparatuses according to the invention is applicable to a loop diagnosis system for disk array apparatuses having a plurality of loops for executing instructions from a host unit and consisting of a plurality of recording media, comprising:

a loop monitoring step to detect any abnormality in any of the loops; and a loop control step to control the loops according to the result of monitoring at the loop monitoring step.

In the loop diagnosis method for disk array apparatuses according to the invention, at the loop control step, if any abnormality in a specific loop is detected at the loop monitoring step, the execution of any instruction in the specific loop is suspended.

In the loop diagnosis method for disk array apparatuses according to the invention, at the loop control step, after suspending the execution of any instruction in the specific loop, another loop than the specific loop is substituted for further execution of the instruction done by the specific loop until then.

In the loop diagnosis method for disk array apparatuses according to the invention, at the loop control step, after substituting the execution of the instruction previously done by the specific loop, the specific loop is diagnosed.

In the loop diagnosis method for disk array apparatuses according to the invention, at the loop control means, after diagnosing the specific loop, a specific one of the recording media is severed from the specific loop.

In the loop diagnosis method for disk array apparatuses according to the invention, at the loop control step, after severing the recording medium from the specific loop, the execution of any instruction by the specific loop is released from suspension.

BRIEF DESCRIPTION OF THE DRAWINGS

The novel features believed to be characteristic of the present invention are set forth in the appended claims. The invention itself, however, as well as other features and advantages thereof, will be best understood with reference to the detailed description which follows, when read in conjunction with the accompanying drawings, wherein:

DESCRIPTION OF THE PREFERRED EMBODIMENTS

Figure 1:
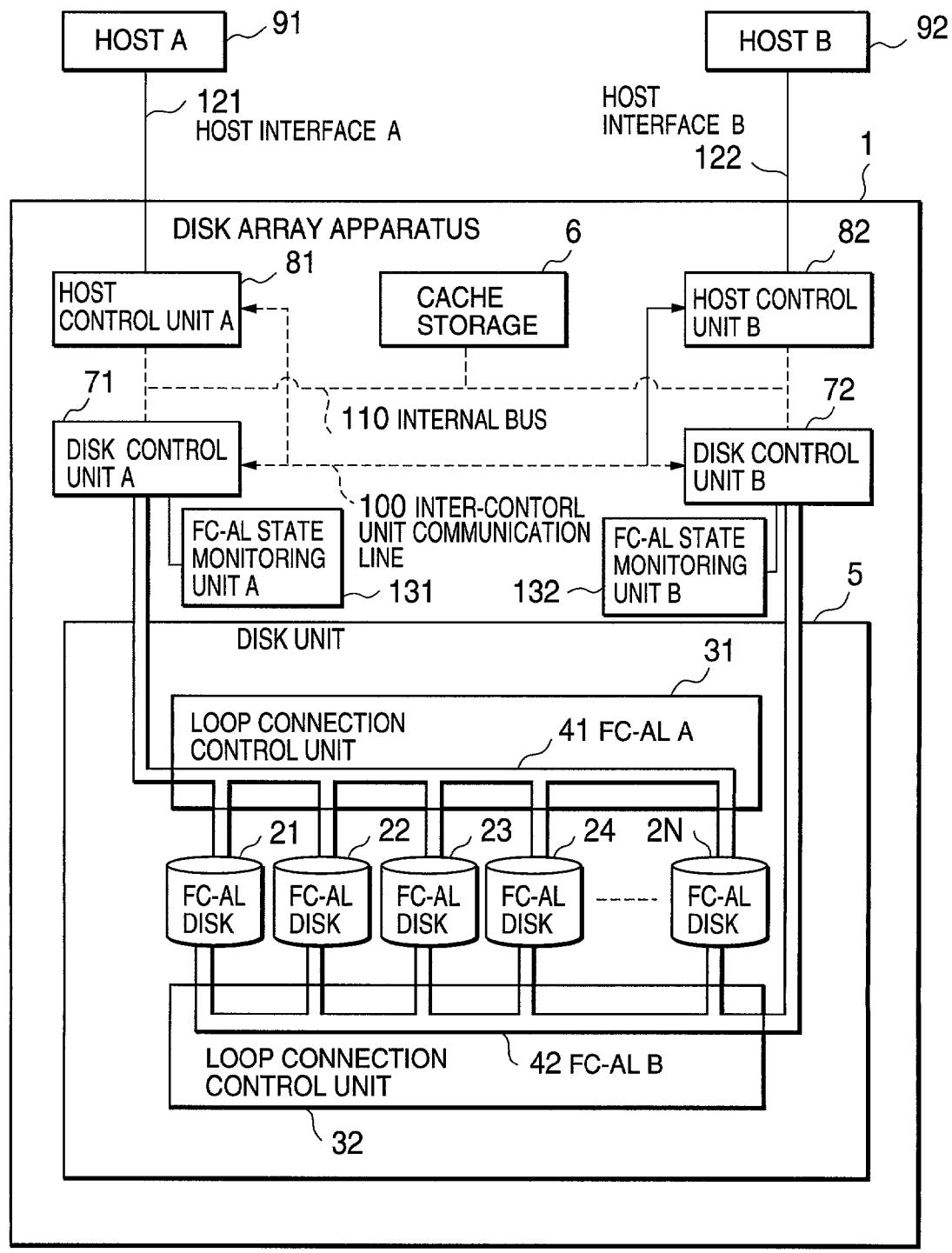
FIG. 1 illustrates the configuration of a loop diagnosis system for disk array apparatuses, which is a first preferred embodiment of the invention.

The preferred embodiments of the present invention will be described in detail below with reference to the accompanying drawings. FIG. 1 illustrates the configuration of the loop diagnosis system for disk array apparatuses, which is the first preferred embodiment of the invention. Referring to FIG. 1, the loop diagnosis system for disk array apparatuses embodying the invention in its first aspect is configured of a disk array apparatus 1.

The disk array apparatus 1 comprises a disk unit 5, a cache storage 6, a disk control unit A71, another disk control unit B72, a host control unit A81, another host control unit B82, an FC-AL state monitoring unit A131 and another FC-AL state monitoring unit B132. The disk control units A71 and B72, the host control units A81 and B82 and the cache storage 6 are connected to one another by an internal bus 110, and the disk control units A71 and B72 and the host control units A81 and B82 are connected to one another by an inter-control unit communication line 100.

Further, the disk unit 5 is composed of N (N is a positive integer) FC-AL disks 21 through 2N, a loop connection control unit A31, a loop connection control unit B32, an FC-ALA loop 41 and an FC-ALB loop 42.

The disk array apparatus 1, connected to hosts A91 and B92 via host interfaces A121 and B122, have host control units A81 and B82 for performing such host services as command reception, data transfers and status responses between the hosts.

There is no limitation as to the usable type of host interfaces. Various interfaces can be used, including FC-AL SCSIs (small computer system interfaces) and parallel SCSIs. Although the number of host interfaces is two in FIG. 1, there is no limitation to the number of interfaces either.

The host control units A81 and B82, connected by the internal bus 110 to the cache storage 6 and the disk control units A71 and B72, transmit and receive data between each other. Each of the host control units A81 and B82 or of the disk control units A71 and B72, via the inter-control unit communication line 100, requests the other host control unit or disk control unit to perform disk processing and other ways of processing, and gives the other host control unit or disk control unit state notifications including a virtual degeneracy notification and a notification of release from virtual degeneracy.

The disk unit 5 consists of a plurality of FC-AL disks 21 through 2N each having two FC-AL interface ports and loop connection control units A31 and B32. The loop connection control units A31 and B32 control the severance (bypassing) of any of the FC-AL disks 21 through 2N from FC-AL loops A41 and B42 and their connection to the FC-AL loops A41 and B42.

The disk control unit A71 constitutes via the loop connection control unit A31 the FC-AL loop A41 with only one port of each of the plurality of FC-AL disks 21 through 2N, and the other disk control unit B72 constitutes via the loop connection control unit B32 the FC-AL loop B42 with only the other port of each of the FC-AL disks 21 through 2N.

The disk control units A71 and B72, at an instruction from the host control unit A81 and B82 or in their own judgment, performs various ways of disk processing upon the FC-AL disks 21 through 2N including read and write. Also the disk control units A71 and B72, by instructing the loop connection control units A31 and B32, can sever any one of the FC-AL disks 21 through 2N from, or connect any to, the FC-AL loops A41 and B42. Either one of the disk control units A71 and B72 can access the FC-AL disks 21 through 2N.

The FC-AL state monitoring units A131 and B132 connected to the disk control units A71 and B72 receive the results of execution of disk processing from the disk control units A71 and B72, manage them statistically and, if the number or rate of occurrence of loop abnormalities exceeds a certain threshold, notify the disk control units A71 and B72 of that excess.

Next will be described the operation of the disk array apparatus according to the present invention. Referring to FIG. 1, the host control units A81 and B82, having received a read instruction, a write instruction or some other instruction from the hosts A91 and B92, recognizes necessary items of information including a logical unit number (LUN), an instruction code type and a logical block address (LBA). For instance, the host control units A81 and B82, having received a read instruction from the hosts A91 and B92, if the designated data are in the cache storage 6, immediately transfer the data from the cache storage 6 to the hosts A91 and B92.

If the data are not found in the cache storage 6, the host control units A81 and B82 instruct the disk control units A71 and B72 to store the data read out of the FC-AL disks 21 through 2N into the cache storage 6, and transfer the data from the cache storage 6 to the hosts A91 and B92.

Or, the host control units A81 and B82 having received a write instruction, for instance, from the hosts A91 and B92, store the data received from the hosts A91 and B92 into the cache storage 6. When an instruction to write these data onto a disk is issued from the host control units A81 and B82 to the disk control units A71 and B7, or when the disk control units A71 and B72 detects the presence, in the cache storage 6, of data not yet written onto any disk, the disk control units A71 and B72 write them onto the FC-AL disks 21 through 2N.

The results of execution of disk processing are notified from the disk control units A71 and B72 to the FC-AL state monitoring units A131 and B132, where they are statistically managed. Which of the disk control units A71 and B72 is to control which of the FC-AL disks 21 through 2N is determined according to the LUN or the disk number among the FC-AL disks 21 through 2N, or allocation may be done dynamically to that bearing the less load between the disk control units A71 and B72 after checking their operating states. In any case, as the host control units A81 and B82 and the disk control units A71 and B72 keep in touch with each other via the inter-control unit communication line 100, they share information on which of the disk control units A71 and B72 is instructed to perform disk processing by the host control units A81 and B82 and which of the FC-AL disks 21 through 2N the disk control units A71 and B72 are to control.

Figure 2:
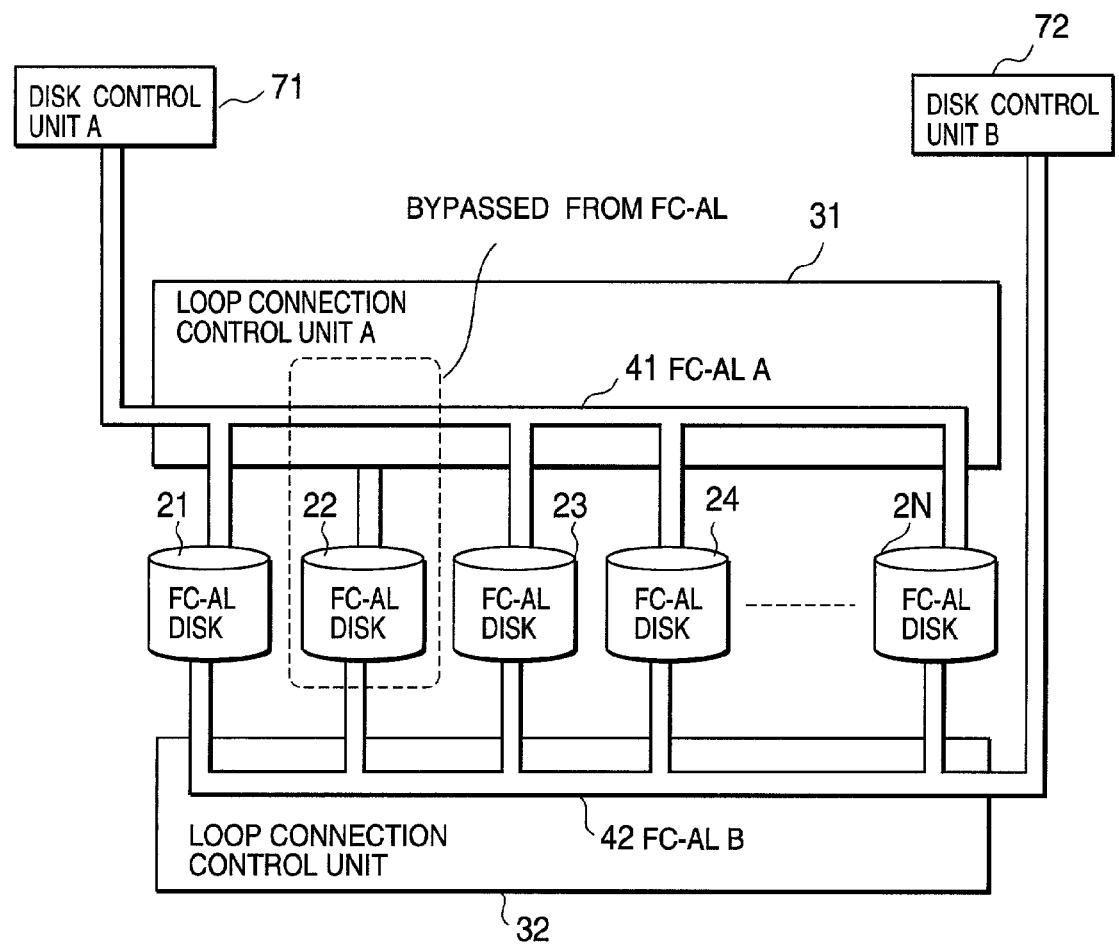
FIG. 2 is a partial configurational diagram of a disk array apparatus 1 for illustrating processing to bypass a disk.

Next will be described the operation of this disk array apparatus 1 with reference to FIG. 2 and FIG. 3. FIG. 2 is a partial configurational diagram of the disk array apparatus 1 for illustrating the processing to bypass a disk, and FIG. 3, a flow chart of the operation of the disk array apparatus 1.

The following description will refer to an exemplary case in which the FC-AL loop A41 has run into a loop abnormality. Obviously, the operation will be the same in an instance in which the FC-AL loop B42 has run into a loop abnormality. For instance, it is supposed that a failure of one of the FC-AL disks 21 through 2N has invited intermittent occurrences of a loop abnormality, such as a link-down, in the FC-AL loops A41 (see S1 in FIG. 3). In this context, the failure of one of the FC-AL disks 21 through 2N is not a failure in a common part within the disk which is relevant to both of the paired loops, but one in an inherent part of the disk involving only one loop. In other words, the FC-AL disk concerned can be processed via one loop if it cannot be via the other loop.

Figure 3:
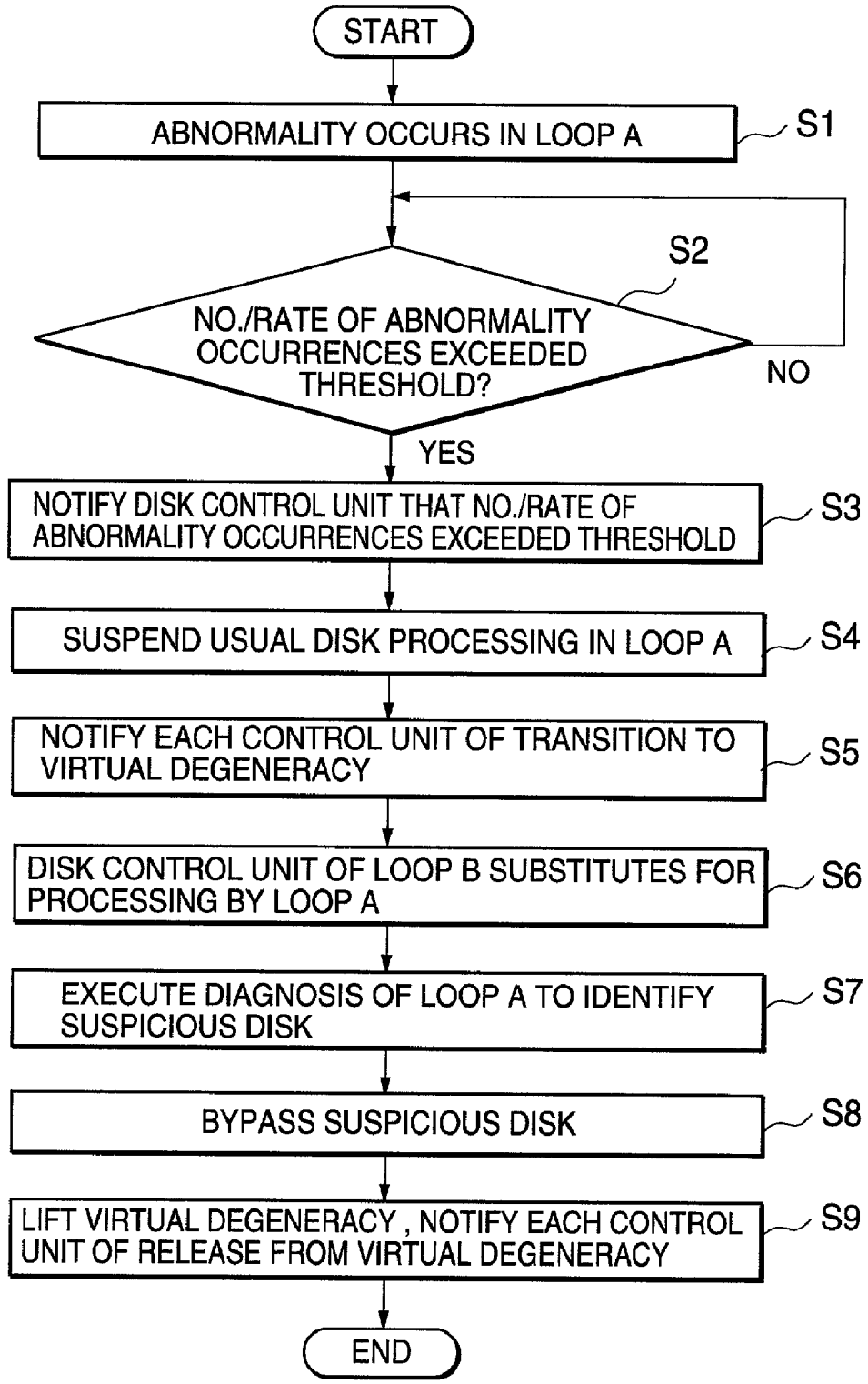
FIG. 3 is a flow chart of the operation of the disk array apparatus 1.

The FC-AL state monitoring unit A131, if it finds that the number or rate of occurrence of loop abnormalities has exceeded a certain threshold (see S2 in FIG. 3), notifies the disk control unit A71 of that excess (see S3 in FIG. 3).

So notified, the disk control unit A71 suspends the execution of usual disk processing (this state in which the usual function is suspended will be referred to as a state of virtual degeneracy) (see S4 in FIG. 3), and notifies the host control units A81 and B82 and the other disk control unit B42 of the transition to the state of virtual degeneracy via the inter-control unit communication line 100 (see S5 in FIG. 3).

Notified of this virtual degeneracy, the disk control unit B72 first executes resetting of the FC-AL disks 21 through 2N, and cancels all the items of processing hung up by the abandonment of disk processing by the virtually degenerate disk control unit A71 in the FC-AL disks 21 through 2N. The disk control unit B72 also performs all the items of disk processing instructed by the host control units A81 and B82 and those that have to be processed in its own judgment upon all of the FC-AL disks 21 through 2N (see S6 in FIG. 3).

Also, so notified of virtual degeneracy, the host control units A81 and B82 renew their request, this time to the disk control unit B72, to perform the disk processing which was previously requested to the virtually degenerate disk control unit A71 but remains unprocessed. As long as the disk control unit A71 remains virtually degenerate, they request the substitute disk control unit B72 to perform all the items of disk processing by new host I/O (see S6 in FIG. 3).

On the other hand, the virtually degenerate disk control unit A71 performs processing to identify the faulty one out of a plurality of devices connected to the FC-AL loop A41 (loop diagnosis) (see S7 in FIG. 3).

The disk control unit A71 issues a group of commands for loop diagnosis to all the FC-AL disks 21 through 2N connected to the FC-AL loops A41 and B42. The disk control unit A71 analyzes the circumstances of the occurrence of the loop abnormality, and specifies a disk suspected of having invited the abnormality (see S7 in FIG. 3).

If, for instance, the suspected device is the FC-AL disk 22, it instructs the loop connection control unit A31 to sever the FC-AL disk 22 from the FC-AL loop A41 as shown in FIG. 2 (see S8 in FIG. 3).

Having completed the loop diagnosis, the disk control unit A71 notifies the host control units A81 and B82 and the other disk control unit B72 of its release from the state of virtual degeneracy (notification of release from virtual degeneracy) and transition to the normal state via the inter-control unit communication line 100 (see S9 in FIG. 3).

The disk control unit A71 released from virtual degeneracy resumes disk processing as its usual function except processing on the bypassed disk. Notified of the release from virtual degeneracy, the disk control unit B72 stops processing on the disk for which the disk control unit A71 released from virtual degeneracy was originally responsible, and causes the disk control unit A71 to take over that processing. It then takes charge of processing on the disk severed from the other loop for loop diagnosis and items of processing on the remaining disks, for which the disk control unit B72 was originally responsible before the notification of virtual degeneracy. Notified of there lease from virtual degeneracy, the host control units A81 and B82 request the disk control units A71 and B72 according to the allocation of disks described above.

Figure 4:
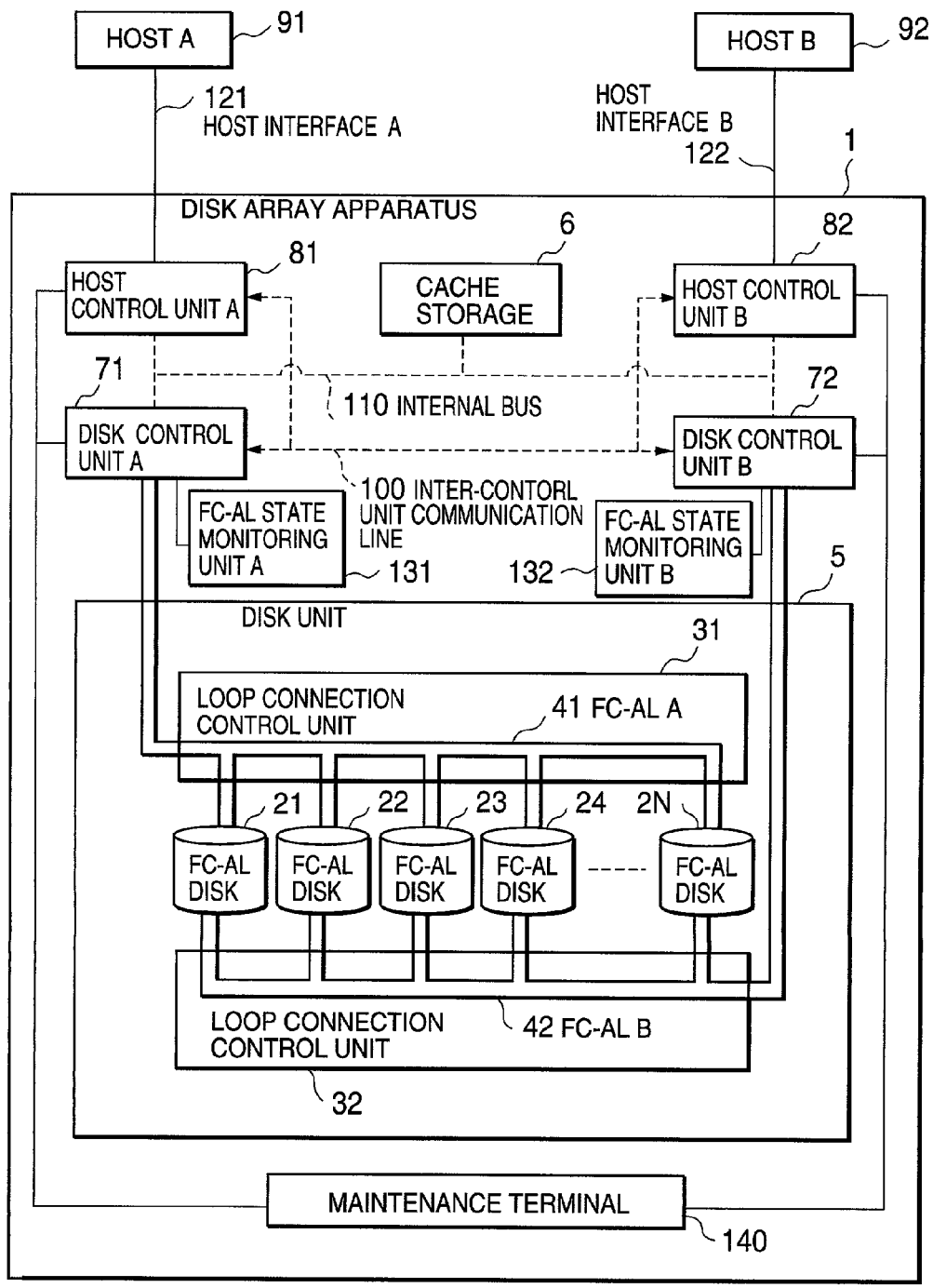
FIG. 4 illustrates the configuration of another loop diagnosis system for disk array apparatuses, which is a second preferred embodiment of the invention.

Next will be described a second preferred embodiment of the present invention. FIG. 4 illustrates the configuration of another loop diagnosis system for disk array apparatuses, which is the second preferred embodiment of the invention. The same constituent elements as in the first embodiment will be assigned respectively the same reference numerals, and their description will be dispensed with (see FIG. 1).

Referring to FIG. 2, the configuration of the second embodiment differs from that of the first embodiment in that a maintenance terminal 140 is newly added. The maintenance terminal 140 is connected to the disk control units A71 and B72 and the host control units A81 and B82.

The maintenance terminal 140 can issue instructions to the disk control units A71 and B72 and the host control units A81 and B82. These instructions include an instruction of transition to the state of virtual degeneracy and an instruction to cause various items of information to be displayed on the maintenance terminal 140.

Also, the maintenance terminal 140 displays on it items of information extracted from the disk control units A71 and B72 and the host control units A81 and B82. These items of information include whether or not there is any bypassed FC-AL disk and, if there is, which FC-AL disk has been bypassed, or whether the state of the disk control unit A71 or B72 is normal or virtually degenerate.

The disk control unit A71 or B72 may shift to the state of virtual degeneracy and carry out loop diagnosis not only at an instruction from the FC-AL state monitoring unit A131 or B132 but also an instruction from the maintenance terminal 140. Where the frequency of occurrence of loop abnormalities is too low to exceed the threshold prescribed by the FC-AL state monitoring units A131 and B132 or at the time of regular maintenance, it is possible for the maintenance personnel to cause at their own discretion the maintenance terminal 140 to have the disk control unit A71 or B72 start loop diagnosis.

As described with reference to the first embodiment, when the FC-AL loop A41 side of the FC-AL disks 22 is bypassed on account of a loop abnormality, even if a port failure occurs on the FC-AL loop B42 side, the disk array configuration will allow continued operation in a disk-degenerate state, but it is more desirable to replace the faulty disk at an early opportunity and return to the redundant configuration which would allow control from both the FC-AL loop A41 and the FL-Al loop B42. The maintenance terminal 140 displays the presence of a bypassed FC-AL disk to urge the maintenance personnel to replace the faulty disk.

According to one aspect of the present invention, it is possible to avoid the interruption of normal disk processing while processing to identify any faulty disk is being executed, because the loop diagnosis system for disk array apparatuses according to this aspect includes a recording means having a plurality of loops for executing instructions from a host unit and consisting of a plurality of recording media; a loop monitoring means for detecting any abnormality in any of the loops; and a loop control means for controlling the loops according to the result of monitoring by the loop monitoring means.

According to another aspect of the invention, the same advantage is provided because the loop diagnosis method applicable to a loop diagnosis system for disk array apparatuses having a plurality of loops for executing instructions from a host unit and consisting of a plurality of recording media according to this aspect includes a loop monitoring step to detect any abnormality in any of the loops; and a loop control step to control the loops according to the result of monitoring at the loop monitoring step.

More specifically, in the loop diagnosis system for disk array apparatuses according to the invention, if any loop abnormality occurs intermittently in an FC-AL (loop) to which disks are connected, usual disk processing on the abnormal loop side is suspended temporarily, and loop diagnosis to identify the faulty device is executed during which usual disk processing by host I/O or the like can be continued in parallel by a normal loop.

Therefore, even while loop diagnosis is being processed, a sufficient time for loop diagnosis can be secured without interrupting host I/O processing and accurate diagnosis can be carried out, making it possible to pinpoint and remove the faulty device even if the loop abnormality is intermittent. Furthermore, the consequent relief from the limitation on the time available for loop diagnosis, it is also possible to further increase the number of disks connected or to extend the length of time spent on loop diagnosis so that the accuracy of diagnosis can be enhanced by improving the algorithm of loop diagnosis processing.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A loop diagnosis system for disk array apparatuses, comprising:
    a recording unit having a plurality of loops for executing instructions from a host unit and a plurality of recording media;
    a loop monitoring unit for detecting any abnormality in any of said loops; and
    a loop controller for controlling said loops according to the result of monitoring by said loop monitoring unit, wherein
    said loop controller, if said loop monitoring unit detects any abnormality in a specific loop, suspends the execution of any instruction in said specific loop, wherein:
    said loop controller, after suspending the execution of said any instruction in said specific loop, substitutes another loop than said specific loop for further execution of said any instruction previously being done by said specific loop until the suspension, and
    said loop controller, after substituting the execution of the instruction previously done by said specific loop, diagnoses said specific loop.

2. The loop diagnosis system for disk array apparatuses, as claimed in claim 1, wherein:
    said loop controller, after diagnosing said specific loop, severs a specific one of said recording media from said specific loop.

3. The loop diagnosis system for disk array apparatuses, as claimed in claim 2, wherein:
    said loop controller, after severing said recording medium from said specific loop, releases the execution of any instruction by said specific loop from suspension.

4. The loop diagnosis system for disk array apparatuses, as claimed in claim 3, further includes:
    a maintenance terminal for entering information equivalent to the result of monitoring by said loop monitoring unit from elsewhere than said plurality of loops, wherein said loop controller controls said loops according to information entered into said maintenance terminal.

5. The loop diagnosis system for disk array apparatuses, as claimed in claim 4, wherein:
    said maintenance terminal displays information extracted from said loop controller.

6. The loop diagnosis system for disk array apparatuses, as claimed in claim 1, wherein,
    said loop controller, after substituting the execution of the instruction previously done by said specific loop, diagnoses said specific loop by identifying a faulty one device out of a plurality of possibly faulty devices connected to said specific loop.

7. A loop diagnosis method applicable to a loop diagnosis system for disk array apparatuses having a plurality of loops for executing instructions from a host unit and a plurality of recording media, including the steps of:
    a loop monitoring step to detect any abnormality in any of said loops; and
    a loop control step to control said loops according to the result of monitoring at said loop monitoring step, wherein:
    at said loop control step, if any abnormality in a specific loop is detected at said loop monitoring step, the execution of any instruction in said specific loop is suspended,
    at said loop control step, after suspending the execution of any instruction in said specific loop, another loop than said specific loop is substituted for further execution of the any instruction previously being done by said specific loop until the suspension, and at said loop control step, after substituting the execution of the instruction previously done by said specific loop, said specific loop is diagnosed.

8. The loop diagnosis method for disk array apparatuses, as claimed in claim 7, wherein:

at said loop control step, after diagnosing said specific loop, a specific one of said recording media is severed from said specific loop.

9. The loop diagnosis method for disk array apparatuses, as claimed in claim 8, wherein:

at said loop control step, after severing said recording medium from said specific loop, the execution of any instruction by said specific loop is released from suspension.

10. The loop diagnosis method for disk array apparatuses, as claimed in claim 7, wherein, at said loop control step, after substituting the execution of the instruction previously done by said specific loop, said specific loop is diagnosed by identifying a faulty one device out of a plurality of possibly faulty devices connected to said specific loop.

11. A loop diagnosis system for disk array apparatuses, comprising:

a recording unit having a plurality of loops for executing instructions from a host unit and a plurality of recording media;

plural disks connected to each of the plural loops;

a loop monitoring unit for detecting an abnormality in any of said loops; and a loop controller for controlling said loops according to the result of monitoring by said loop monitoring unit, wherein said loop controller, if said loop monitoring unit detects an abnormality in a specific loop, suspends the execution of any instruction in said specific loop, wherein:

said loop controller, after suspending the execution of said any instruction in said specific loop, substitutes another loop for said specific loop for further execution of said any instruction previously being done by said specific loop until the suspension, and said loop controller, after substituting the execution of the instruction previously done by said specific loop, diagnoses said specific loop to determining which one disk of plural said disks connected to said specific loop is suspected of having the detected abnormality.

12. The loop diagnosis system for disk array apparatuses, as claimed in claim 11, wherein, said loop controller diagnoses the one disk by issuing a group of commands for loop diagnosis of all the disks connected to said specific loop, and said commands analyzes the circumstances of the occurrence of the loop abnormality, and specifies said one disk suspected of having invited the abnormality.

13. The loop diagnosis system for disk array apparatuses, as claimed in claim 12, wherein, said loop controller, after diagnosing said specific loop, severs said one disk from said specific loop.

14. The loop diagnosis system for disk array apparatuses, as claimed in claim 13, wherein, said loop controller, after severing said one disk from said specific loop, releases the execution of any instruction by said specific loop from suspension.

15. The loop diagnosis system for disk array apparatuses, as claimed in claim 14, further includes:

a maintenance terminal for entering information equivalent to the result of monitoring by said loop monitoring unit from elsewhere than said plurality of loops, wherein said loop controller controls said loops according to information entered into said maintenance terminal.

16. The loop diagnosis system for disk array apparatuses, as claimed in claim 15, wherein:

said maintenance terminal displays information extracted from said loop controller.

* * * * *